United States Patent [19]
Kawaki et al.

[11] Patent Number: 4,888,401
[45] Date of Patent: Dec. 19, 1989

[54] MOLDING MATERIAL FOR OPTICS

[75] Inventors: Takao Kawaki, Tokyo; Yasuhiko Kijima; Yuh Miyauchi, both of Chiba; Eizi Ukita; Toru Nakajima, both of Tokyo; Mituhiko Masumoto, Osaka, all of Japan

[73] Assignee: Mitsubishi Gas Chemical Co., Ltd., Tokyo, Japan

[21] Appl. No.: 202,866

[22] Filed: Jun. 6, 1988

[30] Foreign Application Priority Data

Jun. 5, 1987 [JP] Japan .................................. 62-139819
Aug. 13, 1987 [JP] Japan .................................. 62-200781
Nov. 5, 1987 [JP] Japan .................................. 62-278327

[51] Int. Cl.$^4$ .......................................... C08F 283/02
[52] U.S. Cl. .................................... 525/468; 264/1.1; 525/146; 525/148; 525/185
[58] Field of Search ............... 525/468, 146, 148, 185; 264/1.1

[56] References Cited

U.S. PATENT DOCUMENTS 3,462,515 8/1969 Cantrill ................................ 525/468
4,310,642 1/1982 Margotte et al. ................... 525/468

Primary Examiner—Theodore E. Pertilla
Attorney, Agent, or Firm—Sughrue, Mion, Zinn, Macpeak & Seas

[57] ABSTRACT

A resin composition for optics is disclosed, which mainly comprises a graft copolymer comprising a styrene resin and an aromatic polycarbonate each having a specific molecular weight at a specific ratio of molecular weight and weight, said composition having a micro disperse phase of not more than 0.5 μm. The resin composition has a reduced optical strain and an excellent micro disperse phase and is, therefore, suitable for use as optics.

9 Claims, No Drawings

MOLDING MATERIAL FOR OPTICS

FIELD OF THE INVENTION

This invention relates to a novel molding material for optics comprising a graft copolymer of an aromatic polycarbonate and a styrene resin in which a polycarbonate unit and a styrene resin unit having the respective specific molecular weight constitute the graft copolymer at a specific molecular weight ratio and a specific weight ratio. In particular, it relates to a resin composition which has a reduced optical strain and an excellent micro disperse phase and is, therefore, suitable as a molding material for optics, such as optical discs, optical lenses, etc.

BACKGROUND OF THE INVENTION

Transparent molded articles for optics have hitherto been obtained from acrylic resins taking advantage of their transparency, satisfactory fluidity, small birefringence, and the like as described, e.g., in Japanese Patent Application (OPI) No. 131654/81 (the term "OPI" as used herein means "unexamined published Japanese patent application"). Acrylic resins, however, have disadvantages, such as poor heat resistance (about 70° C.), low impact resistance, and liability to warping on contact with moisture. In order to eliminate these disadvantages, it has been proposed to use a polycarbonate resin having a viscosity-average molecular weight of from 15,000 to 18,000 as a molding material for discs, lenses, etc. as disclosed in Japanese Patent Application (OPI) No. 180553/83. The above-described polycarbonate resin still has problems, such as significant birefringence, that is a bar to use as optics, so that the application to be made of it is limited.

One of important subjects to consider in practical application of optical materials, and chiefly materials for optical discs is reduction of a noise level of a base itself. It has been elucidated that the noise level in question depends on birefringence of incident beam, inclusive of oblique incident beam as reported, e.g., in *Optics*, Vol. 15, No. 5 (Oct., 1986), 441–421, and *Articles of '86 Photo Memory Symposium*, 33–38. That is, reduction of birefringence of vertical incident light does not always correlate to changes of birefringence of oblique incident beam. In the case of polycarbonate resins, this difference is particularly conspicuous. Therefore, it is important to accomplish reduction of birefringence in a wide range of incident angle.

Many proposals have been made to reduce birefringence by using a modified aromatic polycarbonate or a compostion of an aromatic polycarbonate and other resins as taught, e.g., in Japanese Patent Application (OPI) Nos. 19630/86, 19656/86, 18466/87, 20524/87, and 108617/86, and *Functional Materials*, 21–29 (Mar., 1987). All of these proposals have for their object reduction of birefringence of vertical incident beam, and there is no reference to birefringence of oblique incident beam. Therefore, they do not reach full satisfaction from the standpoint of noise level reduction in a wide angle range of beam. A further important consideration is that a composition prepared by mere mixing of polymers or a composition comprising a copolymer but necessarily containing a large quantity of homopolymers tends to have a coarse disperse phase. As a result, if a micro disperse phase grows to a particle size exceeding 0.5 μm, for example, 3 μm, a difference of refractive index is produced microscopically, i.e., among individual beam paths and the interface of dispersed particles becomes a source of scattering due to the difference in refractive index even in a system having its measured birefringence reduced to zero, resulting in optical non-uniformity of the system and thereby noise making.

Hence, the conventional modified polycarbonates involve basic drawbacks for use as a molding material for optics, particularly a base of photo discs.

SUMMARY OF THE INVENTION

The inventors have conducted extensive investigations on a transparent molding material for optics which has a small optical strain in a wide beam angle range and a fine micro disperse phase. As a result, it has now been found that a graft copolymer comprising an aromatic polycarbonate unit and a styrene polymer unit each having a specific molecular weight at a specific molecular weight ratio and at a specific weight ratio has a micro disperse phase of 0.5 μm or less and is suitable for use as a molding material for optics. The present invention has been completed based on this finding.

The present invention relates to a resin composition mainly comprising a graft copolymer comprising a styrene resin and an aromatic polycarbonate, wherein:

(1) the graft copolymer has a weight average molecular weight on a polystyrene conversion (Mw) satisfying formula (1):

$$30,000 \leq Mw \leq 250,000 \tag{1}$$

(2) the aromatic polycarbonate unit has a weight average molecular weight on a polystyrene conversion (PCMw) satisfying formula (2):

$$10,000 \leq PCMw \leq 80,000 \tag{2}$$

wherein, in cases where the graft copolymer comprises a styrene resin as a main chain polymer, PCMw can be obtained by (Mw−PSMw)/Gn, wherein PSMw is a weight average molecular weight of a styrene resin; and Gn is an averaged number of grafting points per styrene resin main chain polymer;

(3) the styrene resin of the graft copolymer has a weight average molecular weight (PSMw) satisfying formula (3):

$$20,000 \leq PSMw \leq 200,000 \tag{3}$$

wherein, in cases where the graft copolymer comprises an aromatic polycarbonate as a main chain polymer, PSMw is a value measured on a residual styrene resin after removal of the aromatic polycarbonate from the graft copolymer by hydrolysis with an amine;

(4) the ratio of the partial molecular weight of the polycarbonate unit to that of the styrene resin unit (PCMw/PSMw) satisfies formula (4):

$$0.1 \leq PCMw/PSMw \leq 4 \tag{4}$$

and (5) the weight ratio of the polycarbonate unit to the styrene resin unit satisfies formula (5):

$$30/70 \leq PC/PS \leq 90/10 \tag{5}$$

wherein PC is a weight of the aromatic polycarbonate unit; and PS is a weight of the styrene resin unit; said resin composition having a micro disperse phase of 0.5 μm or less.

DETAILED DESCRIPTION OF THE INVENTION

The graft copolymer accoding to the present invention preferably has a weight average molecular weight on a polystyrene conversion (Mw) selected from range:

$$60,000 \leq Mw \leq 200,000 \tag{1'}$$

The aromatic polycarbonate unit in the graft copolymer has a weight average molecular weight on a polystyrene conversion (PCMw), as measured by gel-permeation chromatography (GPC) using polystyrene as a standard as hereinafter described, selected from the above-described range (2), preferably from range $$25,000 \leq PCMw \leq 80,000 \tag{2'}$$

and more preferably from range:

$$30,000 \leq PCMw \leq 65,000 \tag{2''}$$

The PCMw inside of the range (2') corresponds to a viscosity-average molecular weight of from 12,000 to 30,000 as measured by the method hereinafter described. When the graft copolymer is prepared by using a styrene resin as a main chain polymer, PCMw is calculated by $(MW-PSMw)/Gn$, wherein PSMw and Gn are as defined above.

The styrene resin unit in the graft copolymer has a weight average molecular weight within the abovedescribed range (3), preferably range:

$$20,000 \leq PSMw \leq 150,000 \tag{3'}$$

and more preferably range:

$$30,000 \leq PSMw \leq 120,000 \tag{3''}$$

When the graft copolymer is prepared using an aromatic polycarbonate as a main chain polymer, PSMw is a measured value of the residual styrene resin unit after removal of the polycarbonate unit from the copolymer by hydrolysis.

The molecular weight ratio of the aromatic polycarbonate unit to the styrene resin unit is in the above-described range (4), preferably range:

$$0.2 \leq PCMw/PSMw \leq 3 \tag{4'}$$

and more preferably range:

$$0.3 \leq PCMw/PSMw \leq 2 \tag{4''}$$

The weight ratio of the aromatic polycarbonate unit to the styrene resin unit is in the range (5), preferably range:

$$40/60 \leq PC/PS \leq 70/30 \tag{5'}$$

The range requirements (1) to (5) and the requirement of a micro disperse phase (0.5 μm or less) depend on each other. It is not until all these requirements are met that the resin composition serves as a satisfactory molding material for optics. A suitable combination of these factors each falling within the respective range makes it possible to provide a molding material whose birefringence is inside of 10 nm with respect to both vertial incident beam and oblique incident beam as measured by the method hereinafter described an which undergoes change of absolute birefringence by only 30 nm or less even when injection molding conditions are varied, for example, when the resin temperature for injection molding is varied to 280° to 340° C. as demonstrated in Table 2 hereinafter given.

The requirements for the graft copolymer according to the present invention will be explained below individually, though such individual explanation gives no more than a secondary meaning because of their dependence on each other.

The requirements (1), (2), and (3) aim at specification of characteristics of the graft copolymer as a molding material, such as mechanical properties and molding properties. If Mw, PCMw, and PSMw are less than the respective lower limit, the graft copolymer is inferior in mechanical properties and the like as required for a molding material. If they exceed the respective upper limit, the graft copolymer would have deteriorated moldability. Requirements (2) and (3) determine the ratio, PCMw/PSMw, as specified by range (4). The ratio PCMw/PSMw predominantly correlates to the absolute birefringence. If it is out of the range (4), the dependence of birefringence on molding temperature would become large. The range (5) predominantly correlates to an optical strain in a wide angle range of beam. If it is out of the range (5), it is impossible to reduce the difference in birefringence between vertial incident beam and 30° inclined incident beam.

The graft copolymers which can be used as a transparent molding material for optics includes both of those comprising an aromatic polycarbonate as a main polymer chain and those comprising a styrene resin as a main polymer chain.

The graft copolymer comprising an aromatic polycarbonate as a main polymer can be synthesized through various methods. A typical method comprises copolymerizing an aromatic polycarbonate having a molecular weight within the range (2) and carrying at the terminal thereof at least one graft polymerization starting point exemplified by an unsaturated double bond per molecule in average and a styrene monomer as described in Japanese Patent Publication Nos. 25078/73 and 33849/86 and Japanese Patent Application No 28194/87.

The aromatic polycarbonate having at the terminal thereof at least one graft polymerization starting point, e.g., an unsaturated double bond, per molecule in average can be prepared by conventional methods known for the production of aromatic polycarbonate resins, such as interfacial polymerization and solution polymerization (e.g., a pyridine method, a chloroformate method, etc.), except for using a molecular weight modifier or chain terminator, such as a monofunctional compound having an unsaturated double bond either alone or in combination with known chain terminators.

Dihydric phenol compounds which can be used for preparing the aromatic polycarbonate unit include bis(4-hydroxyphenyl)methane, bis(4-hydroxyphenyl)ether, bis(4-hydroxyphenyl)sulfone, bis(4-hydroxyphenyl) sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy- 3,5-dimethylphenyl)propane, 1,1-bi(4 -hydroxyphenyl)-1-phenylethane, bis(4-hydroxyphenyl)diphenylmethane, etc. The most preferred of them is 2,2-bis(4-hydroxyphenyl)propane.

The monofunctional compound having an unsaturated double bond for introduction of an unsaturated terminal group includes carboxylic acids, e.g., acrylic acid, methacrylic acid, sorbic acid, etc.; chlorides, e.g., acrylic acid chloride, methacrylic acid chloride, sorbic acid chloride, etc.; chloroformates, e.g., allyl alcohol chloroformate, isopropenylphenol chloroformate, hydroxystyrene chloroformate, etc.; and phenols having hydroxyphenylmaleimide, allyl hydroxybenzoate, methylallyl benzoate, etc. Also included in the monofunctional compound having an unsaturated double bond are compounds having a tertiary carbon atom or a mercapto gorup, such as p-isopropylphenol, m-isopropylphenol, thioglycolic acid chloride, p-mercaptophenol, m-mercaptophenol, etc. These monofunctional compounds may be used either individually or in combination with known terminators.

The monofunctional ccmpounds are used in an amount of from 1 to 25 mol %, preferably from 1.5 to 10 mol %, per mol of the dihydric phenol compound. The monofunctional compounds may be used in combination with known terminators, and in such a co-use, are used in an amount of up to 50 mol %. Of the above-enumerated monofunctional compounds, preferred are methacrylic acid chloride, isopropenylphenol, and hydroxystyrene.

It is also possible to use an aromatic polycarbonate having a graft polymerization starting point, such as an unsaturated double bond, in the molecular chain thereof. Such an aromatic polycarbonate can be prepared according to the known method with the exception that a part of the dihydric phenol monomer is replaced with a monomer having an unsaturated double bond, such as dimers of isopropenylphenol, hydroxystyrene, etc.

The graft copolymer of the present invention can be prepared by polymerizing a styrene monomer according to the conventional techniques for the production of polystyrene resins, such as bulk polymerization, solution polymerization, suspension polymerization, emulsion polymerization, and the like, except that the polymerization is carried out in the presence of the above-described aromatic polycarbonate having at the terminal thereof at least one grafting starting point, e.g., an unsaturated double bond, per molecule in average and, if necessary, in the copresence of an organic sulfur polymerization regulator and/or a polymerization initiator.

The styrene monomer which can be used in the present invention includes styrene, o-methylstyrene, p-methylstyrene, α-methylstyrene, o-butylstyrene, p-butylstyrene, chlorostyrene, bromostyrene, 2,4-dimethylstyrene, etc., with styrene being preferred.

In the present invention, the above-described styrene monomer may be partly replaced with other vinyl monomers, such as acrylates, e.g., methyl methacrylate, ethyl methacrylate, butyl acrylate, n-hexyl acrylate, butyl acrylate, cyclohexyl methacrylate, glycidyl methacrylate, etc.; acrylic acid, acrylamide, methacrylamide, N-methoxymethacrylamide, acrylonitrile, methacrylonitrile, maleic anhydride, maleimide, and so on. Co-use of styrene and maleic anhydride or maleimide is particularly preferred.

Molecular weight control of the styrene-grafted copolymer can be effected by adjustment of the reaction temperature or the amount of a polymerization initiator to be used and, or by the use of an organic sulfur compound as a molecular weight modifier. The organic sulfur compound to be used preferably include aliphatic or aromatic compounds having from 1 to 30 carbon atoms. Examples of such organic sulfur compounds are primary, secondary or teritary mercaptan compounds (e.g., n-butylmercaptan, isobutylmercaptan, n-octylmercaptan, n-dodecylmercaptan, sec-butylmercaptan, sec-dodecylmercaptan, t-butylmercaptan, etc.), aromatic mercaptan compounds (e.g., phenylmercaptan, thiocresol, 4-t-butylthiocresol, etc.), thioglycolic acid or esters thereof, and mercaptan compounds having from 3 to 18 carbon atoms (e.g., ethylene thioglycol, etc.). Among them, the most preferred are n-butylmercaptan, t-butylmercaptan, and n-octylmercaptan. These organic sulfur compounds are used in an amount of not more than 5% by weight, preferably of from 0.0004 to 1% by weight, based on the total amount of the aromatic polycarbonate having an unsaturated terminal group and the styrene monomer. If the amount exceeds 5% by weight, the attained degree of polymerization is too low to assure mechanical properties.

The grafting of the styrene monomer to the aromatic polycarbonate can be carried out by thermal polymerization or by using a polymerization initiator. The polymerization initiator which can be used includes organic peroxides (e.g., di-t-butyl peroxide, dinonyl peroxide, methyl ethyl ketone peroxide, di-t-butyl perphthalate, lauroyl peroxide, oxyhexane, t-butyl peroxylaurate, di-t-amyl peroxide, dicumyl peroxide, t-butylcumyl peroxide, benzoyl peroxide, etc.), and azo compounds (e.g., 2,2-azobisisobutyronitrile, 1,1-azobiscyclohexanecarbonitrile, 2-cyano-2-propylazoformamide, etc.). The polymerization initiator is usually used in an amount of not more than 1% by weight based on the total amount of the aromatic polycarbonate, the styrene monomer, and the like(i.e., reaction solution).

The graft copolymer according to the present invention wherein the main chain polymer comprises a styrene resin can be synthesized by various methods. A typical method comprises copolymerizing a dihydric phenol and phosgene or diphenyl carbonate in the presence of a chain terminator and a styrene resin having either in the molecule thereof or at the terminal thereof at least one grafting point, such as a phenolic hydroxyl group, per molecule in average and having a molecular weight falling within the range (3).

The styrene resin to be used as a main chain polymer can be prepared by methods known for the production of a polystyrene resin, such as bulk polymerization, solution polymerization, and emulsion polymerization, with the exception that the polymerization of a styrene monomer is effected in the presence of a monofunctional compound having an unsaturated group, e.g., a vinyl group, which provides a grafting point for a polycarbonate and, if desired, in the copresence of an organic sulfur polymerization regulator and/or a polymerization initiator.

Examples of the styrene monomer and vinyl monomer which, if desired, may be combined therewith are the same as those recited for the production of the graft copolymer comprising an aromatic polycarbonate as a main chain polymer.

The grafting of the styrene resin to the aromatic polycarbonate can be carried out in the same manner as described for the graft copolymer comprising an aromatic polycarbonate as a main chain polymer. The molecular weight modifier is used in an amount of not more than 5% by weight, preferably of from 0.0004 to 1% by weight, based on the total amount including the styrene resin ( i.e., the amount of the reaction solution). If the amount exceeds 5% by weight, the degree of polymerization becomes too low to assure mechanical properties.

The monofunctional compound having an unsaturated double bond for introduction of a functional group to the styrene resin includes acids (e.g., acrylic acid, methacrylic acid, sorbic acid, etc.); chlorides (e.g., acrylic acid chloride, methacrylic acid chloride, sorbic acid chloride, etc.); chloroformates (e.g., allyl alcohol chloroformate, isopropenylphenol chloroformate, hydroxystyrene chloroformate, etc.); phenolic compounds having an unsaturated group (e.g., isopropenylphenol, hydroxystyrene, hydroxyphenylmaleimide, allyl hydroxybenzoate, methylallyl benzoate, etc.); and phenyl esters having an unsaturated group (e.g., isopropenylphenyl acetate, acetoxystyrene, acetoxyphenylmaleimide, etc.).

Also included in compounds capable of introducing a functional group to the styrene resin are compounds having a mercapto group, e.g., thioglycolic acid, p-mercaptophenol, m-mercaptophenol, p-mercaptophenyl acetate, m-mercaptophenyl acetate, etc.

From the standpoint of stability, preferred of these functional compounds are phenolic compounds. The phenolic compound is used in such an amount that less than 20, preferably from 0.2 to 15, functional groups, in average, are introduced per molecule of the main polymer, taking the molecular weight of one molecule of the styrene resin as a weight average molecular weight. Such an amount corresponds to a range of from 0.05 to 5.0 mol %, preferably from 0.1 to 2.5 mol %, based on the total amount including the styrene monomer (i.e., the amount of the reaction solution).

The grafting of an aromatic polycarbonate to the styrene resin can be carried out by conventional methods known for the production of an aromatic polycarbonate resin, such as interfacial polymerization and solution polymerization (e.g., a pyridine method, a chloroformate method, etc.), with the exception that the polymerization is effected in the presence of the above-described styrene resin and, if necessary, in the copresence of a conventional chain terminator.

The thus prepared graft copolymer can be used as such or in an appropriate combination with an aromatic polycarbonate resin or a styrene resin. For example, for the purpose of reducing the difference in birefringence between vertial incident beam and oblique incident beam, the graft copolymer comprising an aromatic polycarbonate as a main chain polymer may be mixed with from 10 to 60% by weight, based on the graft copolymer, of an aromatic polycarbonate suitable for use as optics to obtain a resin composition containing around 40% by weight of a styrene resin moiety and having a micro disperse phase of not more than 0.5 μm.

The method for obtaining molded articles for optics from the graft copolymer according to the present invention or a resin composition containing the same is conventional without any particular restricttion. For example, the graft copolymer or composition thereof can be injection molded at a cylinder temperature of from 250° to 360° C., preferably from 280° to 350° C., and at a mold temperature of from 70° to 130° C.

The molding material for optics according to the present invention may further contain various additives known in the art, such as stabilizers, parting agents, ultraviolet absorbents, and the like.

The present invention is now illustrated in greater detail with reference to Reference Examples, Examples, and Comparative Examples, but it should be understood that the present invention is not deemed to be limited thereto. All the percents and ratios in the examples are by weight unless otherwise indicated.

In these examples, the weight average molecular weight on a polystyrene conversion, viscosity-average molecular weight, birefringence, total light ray transmission, clouding point, and particle size of a micro disperse phase were determined according to the following methods:

(1) Weight Average Molecular Weight on Polystyrene Conversion (Mw, PCMw, PSMw):
  Determined by GPC using a polystyrene standard sample.

(2) Viscosity-Average Molecular Weight (Mv):
  (a) Measurement of Solution Viscosity:
  Sample Solution: A 0.5 g/dl methylene chloride solution
  Viscometer: Improved Ubbelohde's viscometer (flow time of methylene chloride alone: 72.36 sec.)
  Measuring Temp.: 20° C.±0.01° C. The flow time of the sample solution was measured to obtain $\eta_{rel}$
  (b) Calculation:
  [η] is calculated from the measured value $\eta_{rel}$ according to equations (i) and (ii) sown below, and Mv is obtained from [η] according to equation (iii) (Schnell's equation).

$$\eta_{sp}=T/T_0-1; \eta_{rel}=T/T_0 \qquad (i)$$

wherein
  $\eta_{sp}$ = specific viscosity
  T = flow time of sample solution
  $T_0$ = flow time of solvent alone $$\eta_{sp}/C=[\eta]+k'[\eta]^2C \qquad (ii)$$

wherein
  [η] = instrinsic visosity
  C = concentration of sample solution (g/100 ml)
  k' = Huggins constant (k'=0.45)

$$[\eta]=Km.Mv^\alpha \qquad (iii)$$

wherein
  $Km = 1.23 \times 10^{-4}$
  $\alpha = 0.83$ (3) Birefringence:
  Specimen: Injection-molded disc of 1.2 mm in thickness and 130 mm in diameter
  Measuring Wavelength: 632.8 nm
  Measuring Device: Autmatic ellipsometer manufactured by Mizojiri Kogaku Kogyo Co., Ltd.
  (a) Vertial Incident Light Birefringence ($Re^0$):
  Birefringence of incident light at a horizontal angle (H) of 0° and a vertical angle (V) of 0° were determined. The term "horizontal angle" means an angle formed with the radial direction of the disc, and the term "vertial angle" means an angle formed with a vertial line perpendicular to the radial direction.
  (b) Oblique Incident Light Birefringence ($Re^{max30}$):
  Birefringence of incident light at a horizontal angle of ±30° and a vertical angle of ±30° were measured, and the maximum of the absolute difference from Re⁰ was obtained.

(4) Micro Disperse Phase:

The particle size of a micro disperse phase was measured by means of an electron microscope.

(5) Total Light Ray Transmission and Clouding Point:

Specimen: Injection-molded strip article [30 mm×60 mm×2.4 mm (t)]

Measuring Device: Haze meter "Model 1001 DPZ", manufactured by Nippon Denshoku Kogyo Co., Ltd.)

SYNTHESIS OF UNSATURATED GROUP-TERMINATED PLYCARBONATE

REFERENCE EXAMPLES 1 TO 4

In 265 l of water was dissolved 22 kg of sodium hydroxide, and 45.6 kg of 2,2-bis(4-hydroxyphenyl)propane (BPA) and 50 g of hydrosulfite were dissolved therein while maintaining at 20° C. To the solution was added 150 l of methylene chloride (MC), and phosgen was then blown thereinto while stirring. Thirty minutes later, 125 kg of MC containing 1.95 kg of p-isopropenyl-phenol was added to the mixture, followed by further blowing phosgen for an additional 30 minutes. After completion of the phosgen introduction, the reaction mixture was vigorously agitated to emulsify, and 3 l of a 1% MC solution of triethylamine was added thereto. The sitrring was further continued for about 1 hour to effect polymerization.

The polymerization mixture was separated into an aqueous phase and an organic phase. The organic phase was neutralized with phosphoric acid, washed with water several times, and dropwise added to methanol to precipitate the produced copolymer. The precipitate was collected by filtration and dried to obtain an unsaturated group-terminated polycarbonate as a white powder. The resulting polymer was designated as PC1. PC 1 had a weight average molecular weight on a polystyrene conversion (PCMw) of 32,000 and a viscosity-average molecular weight (Mv) of 16,000.

PC 2 to PC 4 having a PCMw (Mv) of 45,000 (20,000), 49,500 (22,000), and 54,000 (24,000), respectively, were preprared in the same manner as for PC 1, excpet for changing the amount of the p-isopropenyl-phenol used as a terminator.

REFERENCE EXAMPLE 5

In the same manner as described in Reference Example 1, except for replacing the p-isopropenylphenol with acrylic acid chloride, an unsaturated group-terminated polycarbonate having a PCMw (Mv) of 49,500 (22,000) was synthesized. This polymer was designated as PC 5.

PREPARATION OF GRAFT COPOLYMER COMPRISING AROMATIC POLYCARBONATE AS MAIN CHAIN POLYMER

EXAMPLES 1 AND 2

In a polymerization vessel were charged 2.5 kg of PC 1 synthesized in Reference Example 1 and 11 kg of a styrene monomer (St). After displacing the atmosphere with nitrogen, the mixture was heated to 120° C. while stirring, followed by allowing the mixture to react for 1.5 hours while adding 270 g of St containing 10.8 g of n-dodecymercaptan (NDS). After completion of the reaction, the reaction mixture was cooled and added to methanol to precipitate the product to obtain 3.57 kg of a PC/PS (70:30) graft polymer. The resulting polymer was designated as G 1. The styrene resin moiety of G 1 was found to have a weight average molecular weight (PSMw) of 40,000.

The same procedure as described above was repeated, except for changing the amount of NDS as a molecular weight modifier and the reaction time, to obtain a PC/PS (60:40) graft copolymer having a PSMw of 80,000. The resulting polymer was designated as G 2.

EXAMPLE 3

The same procedure as in Example 1 was repeated, except that the reaction was carried out for 5.25 hours while adding 270 g of St containing 37.9 g of NDS, to obtain 6.25 kg of a PC/PS (40:60) graft copolymer having a PSMw of 40,000. The resulting polymer was designated as G 3.

EXAMPLES 4 AND 5

In a polymerization vessel were charged 2.5 kg of PC 2 synthesized in Reference Example 2 and 11 kg of St. After displacing &he atmosphere with nitrogen, the mixture was heated to 120° C. under stirring, and the mixture was allowed to react for 1.1 hours while adding 135 g of St containing 5.4 g of NDS. After completion of the reaction, the reaction mixture was cooled and added to methanol to precipitate the product to obtain 3.33 kg of a PC/PS (75:25) graft copolymer having a PSMw of 60,000. The resulting polymer was designated as G 4.

The same procedure as described above was repeated, except for changing the amount of NDS as a molecular weight modifier and the the reaction time, to obtain a PC/PS (65:35) graft copolymer having a PSMw of 30,000. The resulting polymer was designated as G 5.

EXAMPLE 6

The same procedure of Example 4 was repeated, except that the reaction was carried out for 5.25 hours while adding 270 g of St containing 18.0 g of NDS, to obtain 6.25 kg of a PC/PS (40:60) graft copolymer having a PSMw of 80,000. The resulting polymer was designated as G 6.

EXAMPLES 7 AND 8

In a polymerization vessel were charged 2.5 kg of PC 3 synthesized in Reference Example 3 and 11 kg of St. After displacing the atmosphere with nitrogen, the mixture was heated to 120° C. under stirring, and the mixture was allowed to react for 2.3 hours while adding 285 g of St containing 11.4 g of NDS. After completion of the reaction, the reaction mixture was cooled and added to methanol to precipitate the product to obtain 4.17 kg of a PC/PS (60:40) graft copolymer having a PSMw of 60,000. The resulting polymer was designated as G 7.

The same procedure as described above was repeated, except for changing the amount of NDS as a molecular weight modifier and the reaction time, to obtain a PC/PS (55:45) graft copolymer having a PSMw of 80,000. The resulting polymer was designated as G 8.

EXAMPLE 9

In St was suspended 2.5 kg of PC 3 synthesized in Reference Example 3 to prepare a 10% PC 3 suspension. The suspension was continuously fed to a pipe reactor equipped with a stationary mixer set at a temperature between 150° and 165° C. with an average liquid retention time of 10 minutes. The effluent was poured into methanol to precipitate the product to obtain a PC/PS (50:50) graft copolymer having a PSMw of 80,000. The resulting polymer was designated as G 9.

EXAMPLE 10

In a polymerization vessel were charged 2.5 kg of PC 5 synthesized in Reference Example 5 and 11 kg of St. After displacing the atmosphere with nitrogen, the mixture was heated to 120° C. under stirring, and the mixture was allowed to react for 2.3 hours while adding 215 g of St containing 8.6 g of NDS. After completion of the reaction, the reaction mixture was cooled and added to methanol to precipitate the product to obtain 4.17 kg of a PC/PS (60:40) graft copolymer having a PSMw of 80,000. This polymer was designated as G 10.

EXAMPLES 11 AND 12

In a polymerization vessel were charged 2.5 kg of PC 4 synthesized in Reference Example 4 and 11 kg of St. After displacing the atmosphere with nitrogen, the mixture was heated to 120° C. under stirring, and the mixture was allowed to react for 2.2 hours while adding 215 g of St containing 8.6 g of NDS. After completion of the reaction, the reaction mixture was cooled and added to methanol to precipitate the product to obtain 4.17 kg of a PC/PS (60:40) graft copolymer having a PSMw of 80,000. This polymer was designated as G 11.

The same procedure as described above was repeated, except for changing the amount of NDS as a molecular weight modifier and the reaction time, to obtain a PC/PS (50:50) graft copolymer having a PSMw of 120,000. The resulting polymer was designated as G 12.

EXAMPLE 13

The procedure of Example 11 was repeated, except that the reaction was carried out for 3.5 hours while adding 400 g of St containing 16.3 g of NDS, to obtain 5.0 kg of a PC/PS (50:50) graft polymer having a PSMw of 60,000. The resulting polymer was designated as G 13.

EXAMPLES 14 AND 15

In a polymerization vessel were charged 2.5 kg of PC 2 synthesized in Reference Example 2 and 11 kg of St. After displacing the atmosphere with nitrogen, the mixture was heated to 120° C. under stirring, and the mixture was subjected to thermal polymerization while adding 1.54 kg of St containing 11.8 g of NDS and 154 g of maleic anhydride. After completion of the reaction, the reaction mixture was cooled and added to methanol to precipitate the product to obtain 4.0 kg of a PC/PS (62:38) graft copolymer having a PSMw of 118,000. The resulting polymer was designated as G 15. The styrene resin moiety in G 14 was found to contain 6% of a maleic anhydride unit.

In the same manner as described above, except for changing the amount of the maleic anhydride, a PC/PS (58:42) graft copolymer having a PSMw of 110,000 was obtained. The resulting copolymer was designated as G 15. The styrene resin moiety in G 15 contained 10% of a maleic anhydride unit.

DETERMINATION OF OPTICAL CHARACTERISTICS

Each of the graft copolymers G 1 to G 15 as prepared in Examples 1 to 15 was fed to a vented extruder having a diameter of 20 mm and pelletized at a cylinder temperature of 240° to 260° C. The pellets were dried at 110° C. for at least 5 hours and injection molded at a cylinder temperature of 290° to 340° C. and at a mold temperature of 90° C. to prepare a disc specimen. Birefringence and micro disperse phase of the specimen on an arbitrary point 42 mm away from the center of the disc were determined. The results obtained are shown in Table 1.

Further, the dried pellets of G 8 obtained in Example 8 were molded into a disc under the same injection molding conditions as described above except for changing the cylinder temperature as shown in Table 2. Birefringence of each of the specimens was determined in the same manner as described above, and the results obtained are shown in Table 2.

TABLE 1

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Starting Polycarbonate | PC 1 | PC 1 | PC 1 | PC 2 | PC 2 | PC 2 | PC 3 | PC 3 | PC 3 | PC 5 | PC 4 | PC 4 | PC 4 | PC 2 | PC 2 |
| Graft Copolymer | G 1 | G 2 | G 3 | G 4 | G 5 | G 6 | G 7 | G 8 | G 9 | G 10 | G 11 | G 12 | G 13 | G 14 | G 15 |
| Mw ($\times 10^3$) | 64 | 92 | 70 | 76 | 62 | 118 | 92 | 100 | 117 | 112 | 111 | 148 | 97 | 123 | 115 |
| PCMw ($\times 10^3$) | 32 | 32 | 32 | 45 | 45 | 45 | 49.5 | 49.5 | 49.5 | 49.5 | 54 | 54 | 54 | 45 | 45 |
| PSMw ($\times 10^3$) | 40 | 80 | 40 | 60 | 30 | 80 | 60 | 80 | 80 | 80 | 80 | 120 | 60 | 118 | 110 |
| PCMw/PSMw | 0.80 | 0.40 | 0.80 | 0.75 | 1.50 | 0.56 | 0.83 | 0.62 | 0.62 | 0.62 | 0.68 | 0.45 | 0.90 | 0.38 | 0.41 |
| PC/PS Weight Ratio | 70/30 | 60/40 | 40/60 | 75/25 | 65/35 | 40/60 | 60/40 | 55/45 | 50/50 | 60/40 | 60/40 | 50/50 | 50/50 | 62/38 | 58/42 |
| Cylinder Temperature (°C.) | 290 | 310 | 305 | 310 | 330 | 310 | 310 | 320 | 310 | 320 | 340 | 330 | 310 | 320 | 330 |
| Birefringence (nm): | | | | | | | | | | | | | | | |
| $Re^0$ | 10 | −20 | 6 | 7 | 20 | 5 | 3 | −7 | 10 | 8 | 11 | −6 | −10 | 7 | 5 |
| $Re^{max}$ 30 | 24 | 7 | 4 | 33 | 16 | 5 | 8 | 7 | 12 | 10 | 11 | 10 | 15 | 5 | 4 |
| Micro Disperse Phase (μm): | | | | | | | | | | | | | | | |
| Max. | 0.5 | 0.5 | 0.5 | 0.5 | 0.5 | 0.5 | 0.5 | 0.5 | 0.5 | 0.5 | 0.5 | 0.5 | 0.5 | 0.15 | 0.15 |
| Average | 0.18 | 0.18 | 0.19 | 0.19 | 0.18 | 0.18 | 0.19 | 0.18 | 0.19 | 0.18 | 0.19 | 0.18 | 0.19 | 0.08 | 0.08 |

TABLE 2

| | Run No. | | | |
|---|---|---|---|---|
| | 1 | 2 | 3 | 4 |
| Cylinder Temp. (°C.) | 280 | 300 | 310 | 340 |

TABLE 2-continued

| | Run No. | | | |
|---|---|---|---|---|
| | 1 | 2 | 3 | 4 |
| Birefringence (nm): | | | | |
| $Re^0$ | −9 | −6 | −5 | 6 |
| $Re^{max}\ 30$ | 5 | 3 | 4 | 5 |

COMPARATIVE EXAMPLES 1 AND 2

PCH4 ("Iupilon H-4000", a trade name of a polycarbonate resin produced by Mitsubishi Gas Chemical Co., Ltd.; PCMw 28,000; Mv 16,000) (Comparative Example 1) or a resin composition comprising PCH 4 and a polystyrene resin containing a carboxylic acid derivative ("Dylark #232" produced by Co., Ltd.; Mw=250,000) at a weight ratio of 80:20 (Comparative Example 2) was dried and pelletized at a cylinder temperature of 250° C. The pellets were molded into a disc specimen and tested in the same manner as described in the foregoing examples. The results obtained are shown in Table 3.

The specimen of Comparative Example 2 visually showed a bluish white cloud, apparently proving unsuitable for use as a transparent material for optics.

COMPARATIVE EXAMPLE 3

A 50:50 mixture of PCE2 ("Iupilon E-2000", a trade name for a polycarbonate resin produced by Mitsubishi Gas Chemical Co., Ltd.; PCMw=63,000; Mv=27,000; main polarizability difference: $110 \times 10^{-25}$ cm$^3$) and a polystyrene resin ("Hymer ST-95", produced by Sanyo Chemical Industries Co., Ltd.; weight average molecular weight: 10,000; main polarizability difference: $-120 \times 10^{-25}$ cm$^3$) was dried and pelletized at a cylinder temperature of 250° C. to prepare a molding compound having a PCMw/PSMw ratio of 6.3. The pellets were molded into a disc specimen and tested in the same manner as described in the foregoing examples. The results obtained are shown in Table 3. From the results of Comparative Example 3, it can easily be understood that birefringence does not always depend on the offset effect of the positive and negative main polarizabilities of resins.

TABLE 3

| | Comparative Example 1 | Comparative Example 2 | Comparative Example 3 |
|---|---|---|---|
| Starting Polycarbonate | PCH4 | PCH4 | PCE2 |
| Grafted Polycarbonate | — | — | — |
| PCMw (× 10$^3$) | — | 28 | 63 |
| PSMw (× 10$^3$) | — | 250 | 10 |
| PCMw/PSMw | — | 0.11 | 6.3 |
| PC/PS Weight Ratio | — | 80/20 | 50/50 |
| Cylinder Temperature (°C.) | 350 | 340 | 310 |
| Birefringence (nm): | | | |
| $Re^0$ | 5 | −10 | 200 or more unmeasurable |
| $Re^{max}\ 30$ | 90 | 60 | |
| Micro Disperse Phase (μm): | | | |
| Maximum | — | 3< | 5< |
| Average | — | 2.5 | — |

PREPARATION OF STYRENE RESIN HAVING GRAFTING POINTS

REFERENCE EXAMPLE 6

In a polymerization vessel were charged 104 g (0.59 mol) of p-isopropenylphenyl acetate, 10 kg (96.2 mol) of St, and 10 kg of chlorobenzene. After displacing the atmosphere with nitrogen, the mixture was heated up to 120° C. while stirring, and the mixture was allowed to react for 10 hours while adding chlorobenzene containing 60 g of n-dodecylmercaptan.

After completion of the reaction, the reaction mixture was added to methanol, and the thus formed precipitate was collected by filtration and dried to obtain a styrene copolymer having a weight average molecular weight (PSMw) of $4.0 \times 10^4$ and a grafting point number (Gn) of 1.0. The resulting copolymer was designated as PS 1.

REFERENCE EXAMPLE 7

In a polymerization vessel were charged 10 kg of St and 10 kg of chlorobenzene. After displacing the atmosphere with nitrogen, the mixture was heated up to 120° C. under stirring and allowed to react for 10 hours while adding 270 g of chlorobenzene containing 27 g of p-acetoxyphenol.

After completion of the reaction, the reaction mixture was added to methanol, and the formed precipitate was collected by filtration and dried to obtain a styrene copolymer having a PSMw of $8.0 \times 10^4$ and a Gn of 1.0. This polymer was designated as PS 2.

REFERENCE EXAMPLE 8

In a polymerization vessel were charged 176 g (1 mol) of p-isopropenylphenyl acetate, 10 kg of St, and 10 kg of chlorobenzene. After displacing the atmosphere with nitrogen, the mixture was heated to 120° C. under stirring, and then allowed to react for 11 hours while adding chlorobenzene containing 50 g of azobisisobutyronitrile.

After completion of the reaction, the reaction mixture was added to methanol, and the formed precipitate was collected by filtration and dried to obtain a styrene copolymer having a PSMw of $4.0 \times 10^4$ and a Gn of 1.9. The resulting copolymer was designated as PS 3.

REFERENCE EXAMPLE 9

St containing 0.5% of p-isopropenylphenyl acetate was continously fed to a pipe reactor equipped with a stationary mixer set at 150° to 160° C. The effluent was led into methanol, and the formed precipitate was collected by filtration and dried to obtain a styrene copolymer having a PSMw of $7.5 \times 10^4$ and a Gn of 1.1. The resulting polymer was designated as PS 4.

PREPARATION OF GRAFT COPOLYMER COMPRISING STYRENE RESIN AS MAIN POLYMER

EXAMPLE 16

In 31 l of water was dissolved 2.6 kg of sodium hydroxide, and 5.5 kg of BPA and 10 g of hydrosulfite were then dissolved therein while keeping the solution at 20° C. To the solution was added 25 l of MC having dissolved therein 2.5 kg of PS 1 obtained in Reference Example 6, and phosgen was blown thereinto while stirring. Thirty minutes later, 20 kg of MC containing 77 g of p-t-butylphenol was added to the reaction mixture, and the blowing of phosgen was further continued for an additional 30 minutes.

After completion of the phosgen introduction, the reaction mixture was vigorously stirred to emulsify. After emulsification, 500 ml of a 1% MC solution of triethylamine was added thereto, followed by stirring for about 1 hour to effect polymerization.

The polymerization mixture was separated into an aqueous phase and an organic phase, and the organic phase was neutralized with phosphoric acid, washed several times with water, and added dropwise to methanol to precipitate the produced copolymer. The precipitate was collected by filtration and dried to obtain a PC/PS (70:30) graft copolymer as a white powder. This copolymer was designated as PSG 1.

PSG 1 was found to have an Mw of 88,000 and a PCMw of $4 \times 10^4$. Seeing that the number of the grafting point Gn of the starting polymer PS 1 was 1.2 while that of the residual grafting point in PSG 1 was less than 0.1, though difficult to quantitatively determine, it was assumed that almost all of the initial grafting points had been consumed by reaction.

EXAMPLES 17 TO 23

Graft copolymers PSG 2 to PSG 8 were produced as a white powder in the same manner as in Example 12, except for changing the kind and amount of the starting styrene copolymer, the amount of the p-t-butylphenol as a chain terminator, and the like as indicated in Table 4.

DETERMINATION OF OPTICAL CHARACTERISTICS

Each of the graft copolymers PSG 1 to PSG 8 as prepared in Examples 16 to 23 was fed to a vented extruder having a diameter of 20 mm and pelletized at a cylinder temperature of from 240° to 260° C.

The pellets were dried at 110° C. for at least 5 hours and injection molded at a cylinder temperature of 300° to 340° C. and at a mold temperature of 90° C. to obtain a disc specimen. Birefringence and micro disperse phase of the specimen were determined in the same manner as in the foregoing examples, and the results obtained are shown in Table 4.

TABLE 4

|  | Example No. | | | | | | | |
| --- | --- | --- | --- | --- | --- | --- | --- | --- |
|  | 16 | 17 | 18 | 19 | 20 | 21 | 22 | 23 |
| Starting Polystyrene | PS1 | PS1 | PS2 | PS2 | PS3 | PS3 | PS4 | PS4 |
| Graft Copolymer | PSG1 | PSG2 | PSG3 | PSG4 | PSG5 | PSG6 | PSG7 | PSG8 |
| PCMw ($\times 10^3$) | 40 | 40 | 55 | 55 | 60 | 60 | 62 | 62 |
| PSMw ($\times 10^3$) | 40 | 40 | 80 | 80 | 40 | 40 | 70 | 70 |
| PCMw/PSMw | 1.0 | 1.0 | 0.69 | 0.69 | 1.5 | 1.5 | 0.78 | 0.78 |
| PC/PS Weight Ratio | 70/30 | 60/40 | 65/35 | 60/40 | 65/35 | 50/50 | 65/35 | 50/50 |
| Cylinder Temp. (°C.) | 300 | 310 | 320 | 340 | 310 | 320 | 330 | 310 |
| Birefringence (nm): | | | | | | | | |
| $Re^0$ | −10 | −15 | −5 | −7 | −4 | −20 | −12 | −15 |
| $Re^{max}\ 30$ | 29 | 10 | 15 | 12 | 10 | 15 | 23 | 20 |
| Micro Disperse Phase (μm): | | | | | | | | |
| Maximum | 0.5 | 0.5 | 0.5 | 0.5 | 0.5 | 0.5 | 0.5 | 0.5 |
| Average | 0.21 | 0.20 | 0.27 | 0.26 | 0.21 | 0.25 | 0.22 | 0.23 |

COMPOSITION CONTAINING GRAFT COPOLYMER

EXAMPLES 24 TO 29

Each of the graft copolymers G 3, G6, and G 13 as prepared in Examples 3, 6, and 13 and an aromatic polycarbonate resin [PCH4, PCE2, or PCS 2 ("Yupiron S-2000" produced by Mitsubishi Gas Chemical Co., Ltd.; PCMw=57,000; Mv=23,000)] were fed to a twin screw extruder at the compounding ratio shown in Table 5 and pelletized at a cylinder temperature of from 240° to 270° C.

The pellets were dried at 110° C. for at least 5 hours and injection molded at a cylinder temperature of from 290° to 320° C. and at a mold temperature of from 90° to 100° C. to prepare a disc specimen. The total light ray transmission, clouding point, and micro disperse phase were determined in the same manner as described above. The results obtained are shown in Table 5.

For comparison, the same determinations were carried on the molding materials of Comparative Examples 1 to 3, and the results are also shown in Table 5.

TABLE 5

|  | Example No. | | | | | | Comp. Example No. | | |
| --- | --- | --- | --- | --- | --- | --- | --- | --- | --- |
|  | 22 | 23 | 24 | 25 | 26 | 27 | 1 | 2 | 3 |
| Composition (part): | | | | | | | | | |
| Graft Copolymer | G3 60 | G3 50 | G6 40 | G6 40 | G13 60 | G13 50 | | | |
| Polycarbonate | PCH4 40 | PCS2 50 | PCS2 60 | PCE2 60 | PCE2 40 | PCH4 50 | PCH4 100 | PCH4 80 | PCE2 50 |
| Polystyrene: | | | | | | | | | |
| DK#232 | | | | | | | | 20 | |
| HMST95 | | | | | | | | | 50 |
| Total Light Ray Transmission (%) | 91 | 91 | 90 | 91 | 91 | 90 | 90 | 88 | semi-transparent |
| Clouding Point | 0.5 | 0.6 | 0.9 | 0.6 | 0.7 | 0.6 | 0.6 | 3.9 | semi- |

TABLE 5-continued

| | Example No. | | | | | | Comp. Example No. | | |
|---|---|---|---|---|---|---|---|---|---|
| | 22 | 23 | 24 | 25 | 26 | 27 | 1 | 2 | 3 |
| (%) | | | | | | | | | transparent |
| Micro Disperse Phase (μm): | | | | | | | | | |
| Maximum | 0.5 | 0.5 | 0.5 | 0.5 | 0.5 | 0.5 | — | 3< | 5< |
| Average | 0.19 | 0.20 | 0.19 | 0.21 | 0.20 | 0.21 | — | 2.5 | — |

As can be apparent from the foregoing description, Examples, and Comparative Examples, the molding material for optics according to the present invention provides molded articles having a markedly reduced difference in birefringence between vertical incident light and oblique incident light, with their absolute values being controllable within ±10 nm, and also showing an extremely fine disperse state in a micro disperse phase. Therefore, the molded articles obtained from the molding material of the invention enjoy great reduction of noise level attributed to not only birefringence but optical non-uniformity in quality. In addition, the dependence of birefringence on an injection molding temperature can be significantly reduced. Accordingly, the molding material of the invention can be suitably applied for the production of optics, such as photo discs, optical lenses, and so on.

While the invention has been described in detail and with reference to specific embodiments thereof, it will be apparent to one skilled in the art that various changes and modifications can be made therein without departing from the spirit and scope thereof.

What is claimed is:

1. A molding material for optics consisting essentially of a graft copolymer consisting essentially of a styrene resin selected from the group consisting of a polystyrene, a styrene/maleic anhydride copolymer, a styrene/maleimide copolymer and a styrene/maleic anhydride/maleimide copolymer and an aromatic polycarbonate, wherein:

(1) said graft copolymer has a weight average molecular weight on a polystyrene conversion (Mw) satisfying formula (1):

$$30,000 \leq Mw \leq 250,000 \quad (1)$$

(2) said aromatic polycarbonate unit has a weight average molecular weight on a polystyrene conversion (PCMw) satisfying formula (2):

$$10,000 \leq PCMw \leq 80,000 \quad (2)$$

wherein, in cases where the graft copolymer comprises a styrene resin as a main polymer, PCMw can be obtained by $(Mw-PSMw)/Gn$, wherein PSMw is a weight average molecular weight of a styrene resin; and Gn is an averaged number of grafting points per styrene resin main chain polymer;

(3) said styrene resin unit of the graft copolymer has a weight average molecular weight (PSMw) satisfying formula (3):

$$20,000 \leq PSMw \leq 200,000 \quad (3)$$

wherein, in cases where the graft copolymer comprises an aromatic polycarbonate as a main chain polymer, PSMw is a value measured on a residual styrene resin after removal of the aromatic polycarbonate from the graft copolymer by hydrolysis;

(4) the ratio of the partial molecular weight of the polycarbonate unit to that of the styrene resin unit (PCMw/FSMw) satisfies formula (4):

$$0.1 \leq FCMw/PSMw \leq [4]2 \quad (4)$$

and (5) the weight ratio of the polycarbonate unit to the styrene resin unit satisfies formula (5):

$$30/70 \leq PC/PS \leq 90/10 \quad (5)$$

wherein PC is a weight of the aromatic polycarbonate unit; and PS is a weigh of the styrene resin unit; said resin composition having a micro-disperse phase of 0.5μ or less.

2. A molding material for optics as in claim 1, wherein said aromatic polycarbonate mainly comprises 2,2-bis(4-hydroxyphenyl)propane.

3. A molding material for optics as in claim 1, wherein said molding material, when molded into a 1.2 mm thick article, shows, an absolute difference in birefringence of not more than 50 nm between a vertical incidence beam and an incidence beam at an angle of 30°.

4. A molding material for optics as in claim 1, wherein said graft copolymer consists essentially of the aromatic polycarbonate as a main polymer and has a PCMw ranging from 25,000 to 80,000 on a polystyrene conversion.

5. A molding material for optics as in claim 1, wherein said graft copolymer consists essentially of the styrene resin as a main polymer and has a PSMw ranging from 20,000 to 150,000 on a polystyrene conversion.

6. A molding material for optics as in claim 1, wherein said graft copolymer has a weight average molecular weight of from 60,000 to 150,000 on a polystyrene conversion.

7. A molding material for optics as in claim 1, wherein said graft copolymer consists essentially of the aromatic polycarbonate unit and the styrene resin unit at a weight ratio of from 40/60 to 70/30.

8. A molding material for optics as in claim 1, wherein said graft copolymer is obtained by bulk polymerization of the aromatic polycarbonate having at the terminal thereof at least one unsaturated double bond and a member selected from the group consisting of a styrene monomer, a mixture or a styrene monomer and maleic anhydride, a mixture of a styrene monomer and maleimide, and a mixture of a styrene monomer, maleic anhydride and maleimide.

9. A molding material for optics as in claim 8, wherein said bulk polymerization is conducted in the presence of an organic sulfur polymerization regulator and/or a polymerization initiator.

* * * * *